(12) United States Patent
Liu et al.

(10) Patent No.: US 8,520,467 B2
(45) Date of Patent: Aug. 27, 2013

(54) USING SEISMIC SENSOR TRANSFER FUNCTIONS FOR HIGH FIDELITY SEISMIC IMAGING

(75) Inventors: Qinglin Liu, Oslo (NO); Daniel Ronnow, Oslo (NO); Kambiz Iranpour, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 485 days.

(21) Appl. No.: 12/720,144

(22) Filed: Mar. 9, 2010

(65) Prior Publication Data

US 2011/0222371 A1 Sep. 15, 2011

(51) Int. Cl.
*H04B 17/00* (2006.01)

(52) U.S. Cl.
USPC ............................................. 367/13

(58) Field of Classification Search
USPC ............................................ 367/13; 73/1.85
See application file for complete search history.

(56) References Cited

U.S. PATENT DOCUMENTS

| | | | |
|---|---|---|---|
| 4,872,114 A | 10/1989 | de Montmollin et al. | |
| 5,163,028 A | 11/1992 | Barr et al. | |
| 5,235,554 A * | 8/1993 | Barr et al. | 367/13 |
| 5,253,217 A | 10/1993 | Justice et al. | |
| 7,225,662 B2 * | 6/2007 | Kamata | 73/1.85 |
| 2006/0042352 A1 * | 3/2006 | Kamata | 73/1.85 |

FOREIGN PATENT DOCUMENTS

| WO | 2006076925 | 7/2006 |
|---|---|---|
| WO | 2009055117 | 4/2009 |

OTHER PUBLICATIONS

International Search Report and Written Opinion of PCT Application No. PCT/US2011/025352 dated Oct. 27, 2011: pp. 1-8.
Ait-Messaoud et al., "New Dimensions in Land Seismic Technology," Oilfield Review, Autumn 2005: pp. 42-53.
Anonymous, "DSU3-428 (Digital Sensor Unit)," Sercel-France, 2009: p. 1.
Hons et al., "Ground motion through geophones and MEMS accelerometers: sensor comparison in theory, modeling and field data," SEG/Santonio Annual Meeting, 2007: pp. 11-15.
Anonymous, "ION Brochures," ION Geophysical Corporation, 2009: pp. 1-24.
Laine et al., "Benefits of MEMS based seismic accelerometers for oil exploration," The 14th International Conference on Solid-State Sensors, Transducers & Eurosensors '07, Jun. 2007: pp. 1473-1477.
Muyzert et al., "The impact of acquisition perturbations on land seismic data," Seg Intl Exposition and 74th Annual Meeting, Oct. 2004: pp. 1-4.
Ninness et al., "A unifying construction of orthonormal bases for system identification," IEEE Transactions on Automatic Control, vol. 42(4): pp. 515-521, 1997.

* cited by examiner

*Primary Examiner* — Mark Hellner

(57) ABSTRACT

A technique includes deploying seismic sensors to perform a seismic survey and during the deployment of the seismic sensors, testing each of the seismic sensors to determine an associated sensor transfer function. The technique includes determining an associated operator to apply to seismic data acquired by each of the seismic sensors in the seismic survey based at least in part on a frequency dependent variation between the associated sensor transfer function and a nominal response for the seismic sensor. The technique includes processing the seismic data, including applying the associated operators to the seismic data.

22 Claims, 6 Drawing Sheets

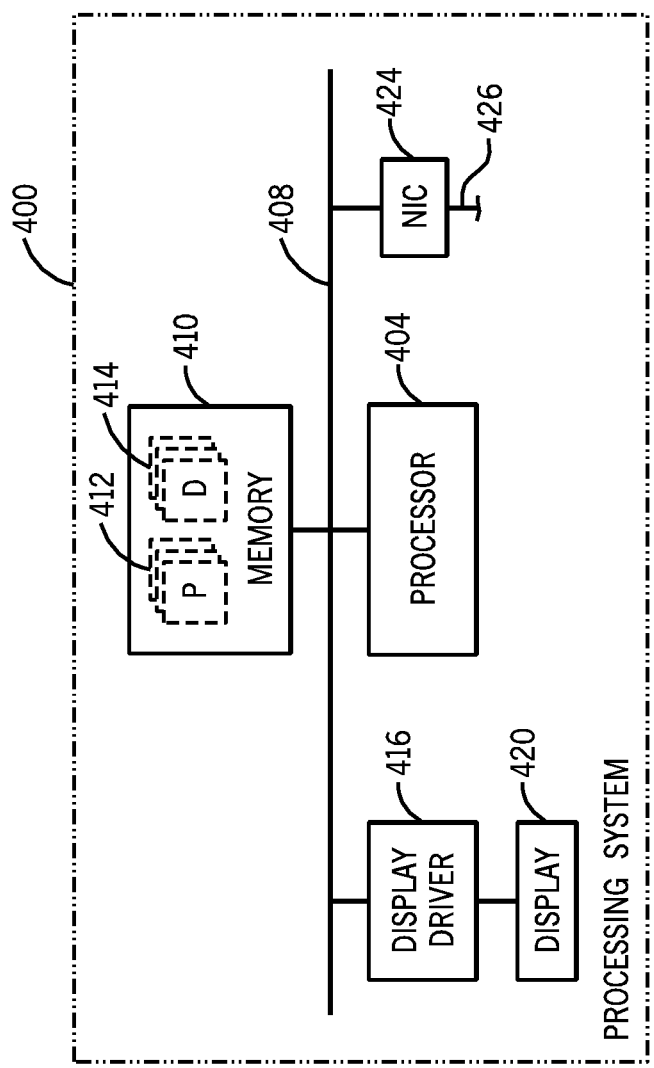

USING SEISMIC SENSOR TRANSFER FUNCTIONS FOR HIGH FIDELITY SEISMIC IMAGING

BACKGROUND

The invention generally relates to using seismic sensor transfer functions for high fidelity seismic imaging.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones) and others are sensitive to particle motion (e.g., geophones). Industrial surveys may deploy only one type of sensors or both. In response to the detected seismic events, the sensors generate electrical signals to produce seismic data. Analysis of the seismic data can then indicate the presence or absence of probable locations of hydrocarbon deposits.

One type of seismic source is an impulsive energy source, such as dynamite for land surveys or a marine air gun for marine surveys. The impulsive energy source produces a relatively large amount of energy that is injected into the earth in a relatively short period of time. Accordingly, the resulting data generally has a relatively high signal-to-noise ratio, which facilitates subsequent data processing operations. The use of an impulsive energy source for land surveys may pose certain safety and environmental concerns.

SUMMARY

In an embodiment of the invention, a technique includes deploying seismic sensors to perform a seismic survey and during the deployment of the seismic sensors, testing each of the seismic sensors to determine an associated sensor transfer function. The technique includes determining an associated operator to apply to seismic data acquired by each of the seismic sensors in the seismic survey based at least in part on a frequency dependent variation between the associated sensor transfer function and a nominal response for the seismic sensor. The technique includes processing the seismic data, including applying the associated operators to the seismic data.

Advantages and other features of the invention will become apparent from the following drawing, description and claims.

BRIEF DESCRIPTION OF THE DRAWING

FIG. 5 is a schematic diagram of a data processing system according to an embodiment of the invention.

DETAILED DESCRIPTION

Figure 1:
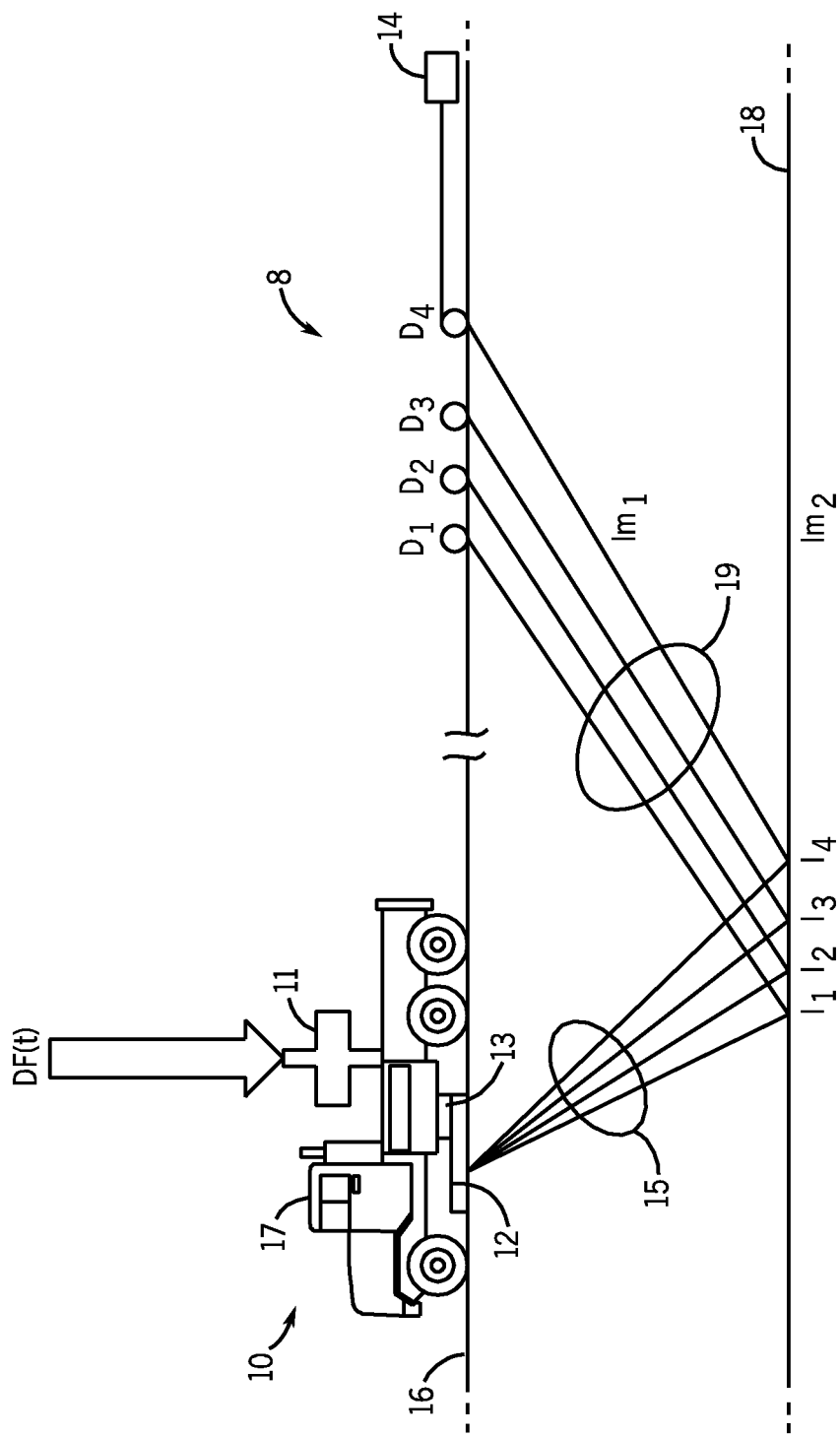
FIG. 1 a schematic diagram of a vibroseis-based seismic acquisition system according to an embodiment of the invention.

In accordance with embodiments of the invention, disclosed herein, transfer functions of seismic sensors are measured during a seismic survey and are used to compensate the seismic data acquired by the sensors during the survey. The seismic sensors, in accordance with some embodiments of the invention, are particle motion sensors. Referring to FIG. 1, as an example, the particle motion sensors may be geophones, such as geophones $D_1$, $D_2$, $D_3$ and $D_4$, which may be used in a land-based seismic survey.

The surface-located geophones $D_1$, $D_2$, $D_3$ and $D_4$ are part of an exemplary land-based vibroseis acquisition system 8, which also includes multiple seismic vibrators 10 (one of which is depicted in FIG. 1) and a data acquisition system 14. As part of operations associated with a vibroseis survey, the seismic vibrator 10 generates at least one vibroseis seismic sweep. More specifically, FIG. 1 depicts a subsurface sweep signal 15 that is generated by the vibrator 10 during the survey for purposes of injecting a vibroseis sweep into the earth. An interface 18 between subsurface impedances $Im_1$ and $Im_2$ reflects the signal 15 at points $I_1$, $I_2$, $I_3$ and $I_4$ to produce a reflected signal 19 that is detected by the geophones $D_1$, $D_2$, $D_3$ and $D_4$, respectively. The geophones $D_1$, $D_2$, $D_3$ and $D_4$ acquire measurements of sweeps that are generated by other seismic vibrators 10, as described further below. The data acquisition system 14 gathers the raw seismic data acquired by the geophones $D_1$, $D_2$, $D_3$ and $D_4$, and the raw seismic data may be processed to yield information about subsurface reflectors and the physical properties of subsurface formations.

For purposes of generating the signal 15, the seismic vibrator 10 may contain an actuator (a hydraulic or electromagnetic actuator, as examples) that drives a vibrating element 11 in response to a sweep pilot signal (called "DF(t)" in FIG. 1). More specifically, the DF(t) signal may be a sinusoid whose amplitude and frequency are changed during the generation of the sweep. Because the vibrating element 11 is coupled to a base plate 12 that is in contact with the earth surface 16, the energy from the element 11 is coupled to the earth to produce the signal 15.

Among its other features, the seismic vibrator 10 may include a signal measuring apparatus 13, which includes sensors (accelerometers, for example) to measure the signal 15 (i.e., to measure the output ground force of the seismic vibrator 10). As depicted in FIG. 1, the seismic vibrator 10 may be mounted on a truck 17, an arrangement that enhances the vibrator's mobility.

The vibrating element 11 contains a reaction mass that oscillates at a frequency and amplitude that is controlled by the DF(t) pilot signal: the frequency of the DF(t) signal sets the frequency of oscillation of the reaction mass; and the amplitude of the oscillation, in general, is controlled by a magnitude of the DF(t) signal. During the generation of the sweep, the frequency of the DF(t) signal transitions (and thus, the oscillation frequency of the reaction mass transitions) over a range of frequencies, one frequency at time. The amplitude of the DF(t) signal may be linearly or non-linearly varied during the generation of the sweep pursuant to a designed amplitude-time envelope.

It is noted that unlike the seismic vibrator 10, a seismic vibrator may alternatively be constructed to be located in a borehole, in accordance with other embodiments of the invention. Thus, seismic sensors, such as geophones, may alternatively be disposed in a borehole to record measurements produced by energy that is injected by borehole-disposed vibrators. Therefore, although specific examples of surface-located seismic vibrators and seismic sensors are described herein, it is understood that the seismic sensors and/or the seismic vibrators may be located downhole in accordance with other embodiments of the invention. In yet other embodiments of the invention, the seismic sensors may be particle motion sensors that are disposed on streamers and are used in a marine-based towed survey, or alternatively, the seismic sensors may be particle motion sensors that are part of a seabed-based acquisition system. Thus, many variations are contemplated and are within the scope of the appended claims.

Seismic sensors should faithfully reproduce the waveform of the measured wavelet. However, there are not any perfect sensors, and the recorded waveform by a given sensor typically is perturbed. As a result, there are typically discrepancies between the original and the measured waveforms. Ideally, the transfer function of a seismic sensor is invariant, or "flat," with respect to frequency for the seismic frequency band. However, the transfer function has some frequency dependence, and hence, the recorded wavelet is distorted in some way. If the transfer function is known, a deconvolution filter may be designed such that the transfer function of the filter is the inverse of the seismic sensor's transfer function. Thus, the quality of seismic signals may be generally improved by deconvolution.

The transfer function of the seismic sensor typically varies among seismic sensors of the same type due to such factors as production variations, temperature effects and aging. The largest errors are perturbations in seismic images derived from the seismic data typically are those that are due to the interaction of the seismic system with its surrounding, i.e., errors that are introduced due to coupling, positioning and tilt. The most significant perturbations in the acquisition system typically are attributable to variations in the transfer functions for the seismic sensors, especially for geophones and geophone accelerometers. Although the sensor transfer functions may be determined, for example, in a laboratory, these determined transfer functions may not be sufficient to design the deconvolution filter for the individual sensors, as temperature variations may cause significant variations in the actual transfer function of the seismic sensor. Such variations may significantly affect the processing of sensitive seismic images, such as the images that are involved in time lapse, or 4-D, seismic analysis.

Figure 2:
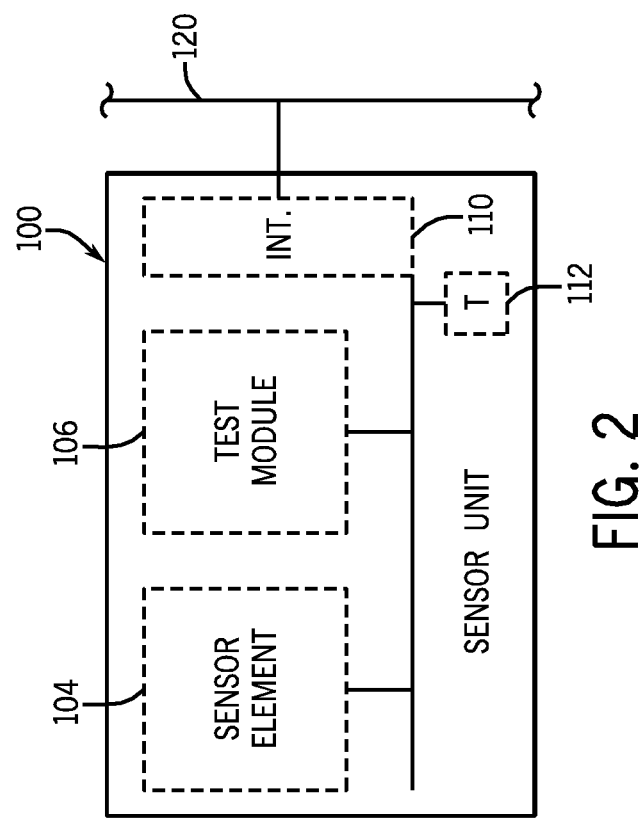
FIG. 2 is a schematic diagram of a seismic sensor unit according to an embodiment of the invention.

Referring to FIG. 2, to account for time-varying and environmental effects, a seismic sensor unit 100 in accordance with some embodiments of the invention, is constructed to measure its transfer function and communicate data indicative of its measured transfer function along with the seismic data acquired by the unit 100. As an example, the seismic sensor unit 100 may be a particle motion sensor that is used for either a marine-based or land-based seismic survey. Regardless of its particular type or application, the seismic sensor unit 100 includes at least one sensor element 104. As a non-limiting example, the sensor element 104 may sense particle motion, such as an acceleration along with a particular axis, for example.

In some embodiments of the invention, the sensor unit 100 includes an internal test module 106 for purposes of performing an internal test to determine a transfer function of the sensor element 104, i.e., a relationship between the magnitude of the gain of the sensor element 104 versus frequency and phase. As described further herein, the sensor element's transfer function may vary with respect to the sensor elements in other sensor units 100 due to process variations in the manufacture of the sensor unit 100. Additionally, over time, time varying effects, such as aging and temperature, may significantly change the element's transfer function. Thus, by employing the test module 106 to perform intermittent internal tests, the sensor unit 100 is able to acquire updated transfer functions that reflect these changes.

As further described below, the sensor unit 100 is constructed to intermittently provide data indicative of the transfer function to a processing station. Therefore, during deployment of the sensor unit 100 (along with other sensor units) for a particular survey, the processing station is able to collect seismic sensor data acquired by the sensor units 100, as well as collect associated data indicative of the transfer functions of the sensor elements that are deployed as part of the survey. In order to provide this information to the processing station, the sensor unit 100 includes a communication interface 110, which electrically or optically couples the sensor unit 100 to, for example, a communication bus 120 (an optical bus, for example). Among its other features, the sensor unit 100 may include a temperature sensor 112 for purposes of measuring the temperature of the sensor element 104 so that adjustments may be made to a transfer function associated with the sensor element 110, as further described below.

In field operations, the internal tests are run regularly in a certain time interval to capture observable environment variations. Each internal test may require a few seconds, which may interrupt seismic acquisition during a continuous recording. Therefore, an alternative approach is to not interrupt continuous recording for high productivity seismic acquisition and perform the internal test less often to obtain the perturbations for sensor-to-sensor, different batches, etc.

It is noted that the tests may be performed in a number of different ways. For example, in accordance with some embodiments of the invention, the test module 106 (see FIG. 2) of each seismic sensor unit 100 may include a vibratory element to initiate a pulse or impulse response of the seismic sensor element 104, which is measured by the internal test module 106. In another variation, a handheld tester (for example) may be used near the seismic sensor unit for purposes of creating a response so that the test module 106 measures the transfer function. In yet another variation, an internal test module may not be employed, as the transfer function may be measured by an external device, such as a handheld sensor tester, which provides data indicative of the measured transfer function.

In accordance with embodiments of the invention, the measured transfer functions are used to determine corresponding matching filters, or deconvolution operators, which are applied to the seismic data acquired by the units 100 to compensate to effectively transform the transfer functions of the sensor elements 110 to the same ideal, nominal response. In other words, by deriving a matching filter for each sensor element 104, all of the sensor elements 104 effectively have the same nominal response. By doing this, the main perturbations in the seismic acquisition system may be reduced significantly. The use of the seismic sensor unit 100 as well as the techniques that construct the deconvolution operators and perform deconvolution to compensate the acquired seismic data may be applied in a number of seismic processing applications, such as time lapse, or 4-D, seismic acquisition; amplitude versus offset (AVO) analysis; inversion and other lithological-related analyses where true amplitude and small changes of subsurface reservoirs are important.

The matching or deconvolution is performed before digital group forming (DGF) or any other types of array forming, data stack or summation processes of the raw single sensor data.

After the transfer functions are calculated from the sensor units 100, the transfer functions may be saved as part of field-recorded seismic data sets. The transfer functions that are calculated in a time interval may be compensated for any relatively significant environmental variations, such as temperature changes within a limited degree range. The transfer functions may be adjusted to take into account environmental variations like temperature continuously with the knowledge of how these environmental variations affect the transfer function. This knowledge may rely on, for example, laboratory tests and potentially modeling of the temperature variations of the sensor element 104. The transfer function deconvolution may be applied to the seismic data during data processing by retrieving the transfer function from the field recorded data sets. The transfer function deconvolution of raw single sensor seismic data removes any perturbation from sensor-to-sensor, from different batches, from temperature related variations, etc.

Figure 3:
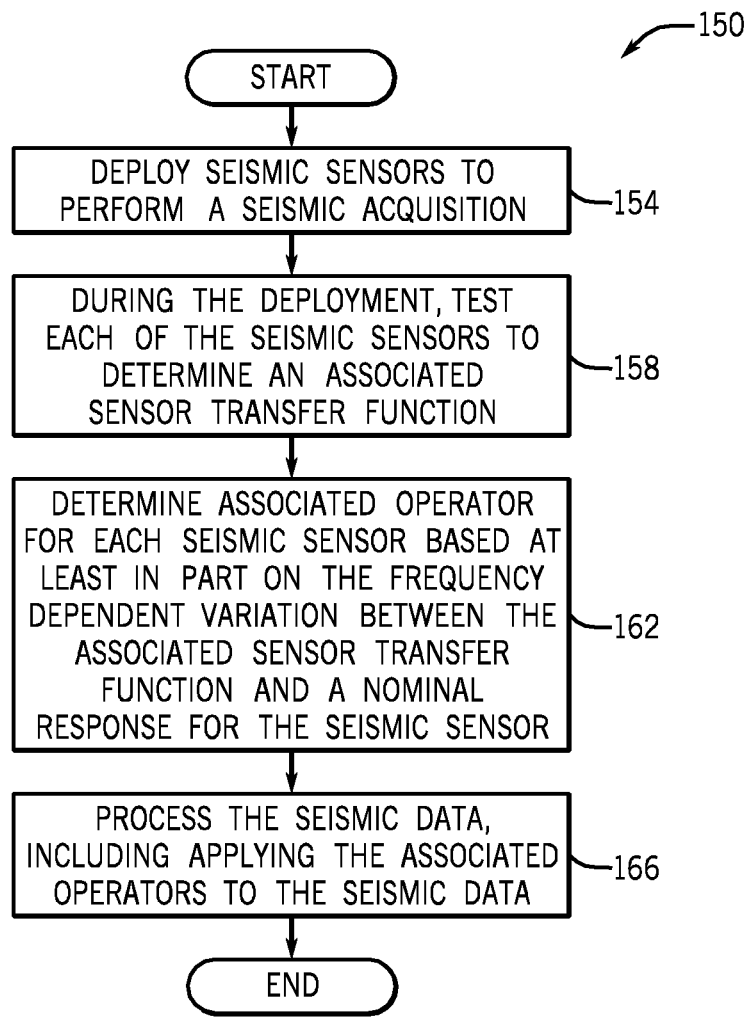
FIGS. 3, 4A and 4B are flow diagrams depicting techniques to use seismic sensor transfer functions for purposes of achieving high fidelity seismic imaging according to embodiments of the invention.

Thus, referring to FIG. 3, a technique 150 in accordance with embodiments of the invention includes deploying (block 154) seismic sensors to perform a seismic acquisition. The technique 150 includes testing (block 158) each of the seismic sensors during their deployment to determine an associated sensor transfer function for each of the seismic sensors.

The technique 150 next includes determining (block 162) an associated operator to apply to the seismic data acquired by each seismic sensor based at least in part on a frequency dependent variation between the associated sensor transfer function and a nominal response. The seismic data are then processed, pursuant to block 166, which includes applying the associated operators to the seismic data.

The data that are indicative of the measured transfer function may take on numerous forms, depending on the particular embodiments of the invention. In accordance with some embodiments of the invention, the sensor unit 100 parameterizes the transfer function. For example, in accordance with some embodiments of the invention, the sensor unit 100 may transmit data indicative of the following four parameters for purposes of representing the measured transfer function: 1.) a sensitivity calibration constant; 2.) a root mean square (RMS) magnitude error (with respect to the nominal response); 3.) an average delay; and 4.) an RMS phase error (with respect to the nominal response). It is noted that other parameters may be used to characterize the transfer function, in accordance with other embodiments of the invention.

As another variation, for the case of a geophone, the parameters may be geophone parameters, which describe the sensitivity, damping, natural frequency, etc., of the geophone. The parameters may be parameters for a number of orthonormal filters, in accordance with embodiments of the invention. As yet another variation, the parameters may indicate the poles and zeros of the transfer function.

In other embodiments of the invention, the seismic sensor unit 100 may communicate data, which is indicative of the entire transfer function. For example, the data may be categorized into three fields: 1.) frequency bins; 2.) transfer function magnitude; and 3.) transfer function phase. As another variation, the entire complex transfer function may be communicated by the sensor unit 100, in accordance with embodiments of the invention. The frequency may be equal distant or the frequency may be varied to compress the information.

As yet another variation, parameters that describe the inverse transfer function or data that describes the entire transfer function may be communicated by the seismic sensor unit 100.

Regardless of the form of the data used to represent the transfer function, the data indicates the frequency dependent variations of the amplitude and/or phase of the transfer function.

The matching of the transfer function to the nominal, ideal response may be achieved in various ways, depending on the particular implementation. One way to match the seismic sensor response to the nominal response is through direct deconvolution in the frequency domain. In this approach, the seismic data for the sensor and the associated transfer function are first transformed into the frequency domain, and deconvolution is applied in the frequency domain. The resultant data is then transformed to the time domain to produce deconvolved sensor seismic data. This approach removes any perturbations, and flattens the sensor amplitude response and phase response. The inverse transfer function in the frequency domain may be obtained directly from the transfer function of the sensor or from the parameters that describe the transfer function.

Another approach to match the single sensor response to the nominal response is through deconvolution in the time domain. In this regard, the second approach involves designing deconvolution filters based on calculated transfer functions. The filters may be derived by matching the calculated transfer function to a specific wavelet in the time domain, for example. As a more specific example, the filter may be a combined symmetrical response of both a low cut filter and an anti-alias filter for seismic recording theoretical response or a nominal sensor response at normal room temperature and standard test conditions. The transfer function deconvolution filters may be applied to the raw single sensor seismic data by a way of convolution of the filters and the seismic data. The deconvolution filters may also be selected from a filter bank based on the parameters that describe the transfer function.

In another approach, the transfer function of the sensor may be used to match the function response of that sensor to a nominal response. This may be achieved in steps. For example, simple filters in a filter bank may be used to reduce or remove magnitude and phase effects of temperature variations. Simple compensation or adjusting filters may be designed for some temperatures based on laboratory data, and the filters for temperatures between may be interpolated. The application of such a filter may match the response of the sensor at any temperature to the response at a particular temperature. This may be achieved before any final deconvolution operator matches the system response to any particular wavelet and may require longer deconvolution filters. Furthermore, production batch variations may be addressed in a similar way. A geophone may be recognized by its identity number and its response may be conditioned based on its batch properties, and a filter set may transform the batch properties of various production batches so that the inter-batch differences may be reduced or removed.

In accordance with some embodiments of the invention, the temperature dependence of the sensor may be modeled. Thus, for this approach, the correct seismic data is determined by first applying amplitude calibration for each sensor. Thereafter, transfer functions for different temperatures may be compensated by frequency domain direct deconvolution or time domain convolutions, as set forth above.

There might be cases in which the determined transfer function of a sensor is outside of specification. For such a case, if the transfer function is outside of the specification but it is deemed that the transfer function was correctly determined, then the seismic data is excluded; and the seismic data may be used as a quality control indicator that the trace is probably bad or may also be an indicator for other hardware failures. If the transfer function is deemed to be erroneously determined and the sensor probably is operating, a reference transfer function may be substituted and used for the deconvolution.

Figure 4A:
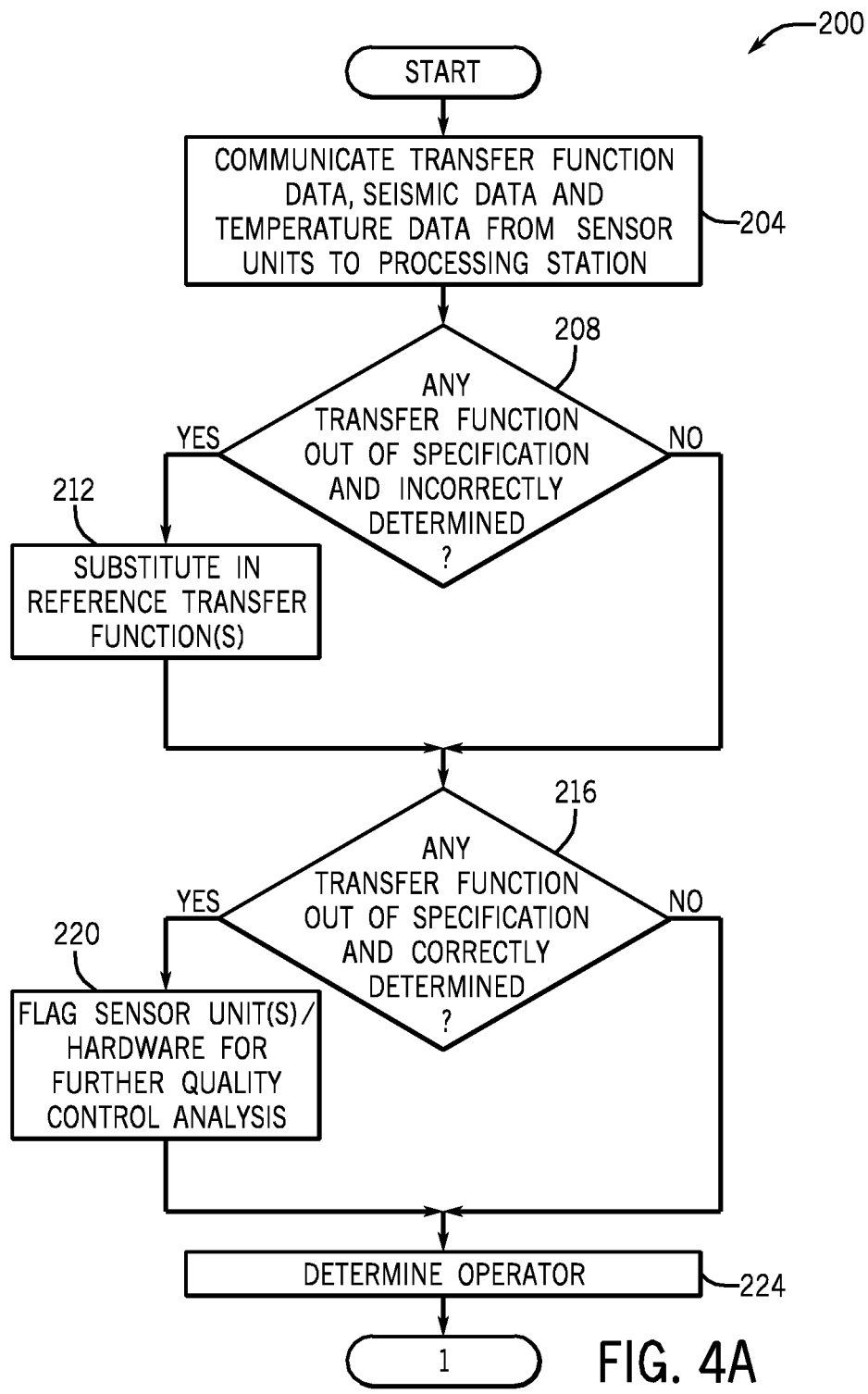
Figure 4B:
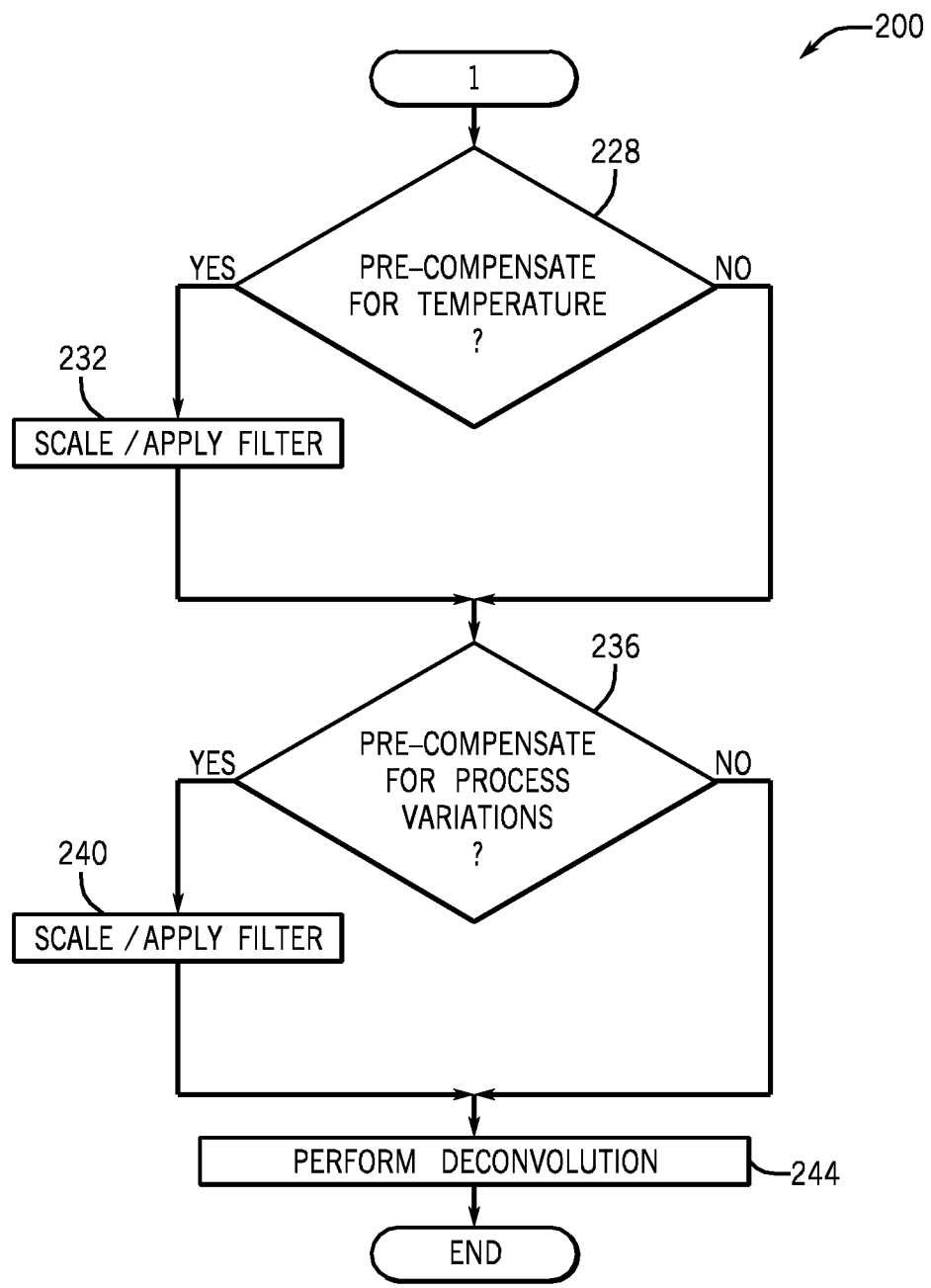

Thus, referring to FIGS. 4A and 4B, a technique 200 in accordance with some embodiments of the invention includes communicating transfer function data, seismic data and temperature data from seismic sensor units deployed to perform a survey to a processing station, pursuant to block 204 (FIG. 4A). If a determination is made (diamond 208) that any of the transfer functions are out of specification and incorrectly determined, then a reference transfer function is substituted for each case, pursuant to block 212. Next, the technique 200 includes determining (diamond 216) whether any of the transfer functions are out of specification and correctly determined. If so, then possible sensor and/or other hardware failure has occurred, and as such, the affected sensor units/hardware are flagged for further quality control analysis, pursuant to block 220. It is noted that the seismic data for the affected seismic sensor units are discarded but may be used for the quality control analysis.

Next, pursuant to the technique 200, operators to compensate the seismic sensor data are determined (block 224) based on the transfer functions. A determination is then made, pursuant to diamond 228 (FIG. 4B), whether to pre-compensate for temperature variations, and if so, the appropriate scaling or filters are applied, pursuant to block 232. A determination is then made, pursuant to diamond 236, whether to pre-compensate for process variations, and if so, the appropriate scaling or filters are applied, pursuant to block 240. The deconvolution is then performed, pursuant to block 244.

Referring to FIG. 5, in accordance with some embodiments of the invention, a processing system 400 may be used for such purposes as receiving data indicative of measured transfer functions of seismic sensors deployed in the field to perform a seismic survey; determining operators to apply to seismic data acquired by these sensors based on these transfer functions; applying operators for the seismic data; or in combination thereof. Depending on the particular embodiment of the invention, the processing system 400 may be located at a well site, at a location in a well field, onboard a vessel, on a platform, at a remote facility, integrated into a streamer, etc., as just a few non-limiting examples. Furthermore, in some embodiments of the invention, the processing system 400 may be a distributed system that is located at multiple remote and/or local locations. Thus, the architecture of the processing system 400 is illustrated merely as an example, as the skilled artisan would recognize many variations and deviations therefrom.

In the example that is depicted in FIG. 5, the processing system 400 includes a processor 404, which executes program instructions 412 that are stored in a system memory 410 for purposes of causing the processor 404 to perform some or all of the techniques that are disclosed herein. As non-limiting examples, the processor 404 may include one or more microprocessors and/or microcontrollers, depending on the particular implementation. In general, the processor 404 may execute program instructions 412 for purposes of causing the processor 404 to perform all or parts of the techniques 150 and/or 200, in accordance with some embodiments of the invention.

The memory 410 may also store datasets 414 which may be initial, intermediate and/or final datasets produced by the processing by the processor 404. For example, the datasets 414 may include data indicative of seismic data; measured sensor transfer functions; matching filters; temperature measurements; a bank of simple filters; a nominal, ideal transfer function; specifications for the transfer functions; mapping to identify failed hardware or quality control issues; etc.

As depicted in FIG. 5, the processor 404 and memory 410 may be coupled together by at least one bus 408, which may couple other components of the processing system 400 together, such as a network interface card (NIC) 424. As a non-limiting example, the NIC 424 may be coupled to a network 426, for purposes of receiving such data as seismic data; data indicative of the measured transfer function; data indicative of temperature measurements; etc. As also depicted in FIG. 5, a display 420 of the processing system 408 may display initial, intermediate or final results produced by the processing system 400. In general, the display 420 may be coupled to the system 400 by a display driver 416. As a non-limiting example, the display 420 may display an image, which graphically depicts measured transfer functions; a nominal ideal transfer function; a location of failed hardware; sensor temperatures; transfer function parameters; etc.

Other embodiments are contemplated and are within the scope of the appended claims. For example, the techniques and systems that are described herein may be applied to hydrophones. Thus, in accordance with embodiments of the invention, a hydrophone may be tested, such as through the use of a step test, for purposes of measuring a transfer function of the hydrophone. The result of the test may then be used to design a deconvolution filter for the hydrophone; and for an entire array, the transfer functions for the hydrophones of the array may be measured and used to design the convolution filters, similar to the techniques and systems that are described above.

As an example of another embodiment of the invention, the techniques and systems that are described herein may likewise be applied to passive seismic acquisition systems, such as passive seismic acquisition systems that are used in connection with reservoir monitoring and hydraulic fracturing, as a few non-limiting examples. In the passive seismic acquisition system, there is no active seismic source, such as vibrator or explosive sources, for example. In accordance with some embodiments of the invention, transfer functions for such seismic sensors as geophones and geophone accelerometers (GACs) may be measured and used to design corresponding deconvolution filters. Other variations are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
deploying seismic sensors to perform a seismic survey, wherein at least one of the seismic sensors is associated with a seismic unit, and the seismic unit is adapted to perform a self-test within the unit to determine an associated sensor transfer function during the deployment of the seismic sensor;
determining an associated operator to apply to seismic data acquired by each of the seismic sensors in the seismic survey based at least in part on a frequency dependent variation between the associated sensor transfer function and a nominal response for the seismic sensor;
processing the seismic data, comprising applying the associated operators to the seismic data;
communicating the seismic data and second data indicative of the determined associated sensor transfer operator from the seismic unit; and
recording the seismic data and the second data.

2. The method of claim 1, further comprising:
during the deployment of the seismic sensors, measuring seismic energy in connection with the survey, subsequently performing the determining of the associated operators and thereafter continuing with measuring of seismic energy in connection with the survey.

3. The method of claim 1, wherein the act of communicating the second data comprises communicating data indicative of at least one of the following:
- the entire transfer function including frequency, magnitude and phase of the transfer function;
- parameters that describe the transfer function;
- parameters that describe the inverse of the transfer function; and
- the entire inverse transfer function, including frequency, magnitude and phase of the inverse transfer function.

4. The method of claim 1, wherein the act of processing the seismic data comprises performing deconvolution in the frequency or time domain.

5. The method of claim 4, wherein the act of processing the seismic data further comprises compensating the seismic data before deconvolution for production variations or temperature variations.

6. The method of claim 5, wherein the act of compensating comprises at least one of the following:
- scaling amplitudes indicated by the seismic data based on observed production variations or temperature variations; and
- applying filters based on observed production variations or temperature variations.

7. The method of claim 1, further comprising:
identifying whether one or more of the transfer functions are outside of predetermined specifications and taking corrective action in response thereto.

8. The method of claim 7, wherein the act of taking corrective action comprises determining whether one or more of the identified transfer functions are correctly determined and using the identification of a transfer function that is outside of predetermined specification and correctly determined as a quality control indicator indicative of potential hardware failure.

9. The method of claim 7, wherein the act of taking corrective action comprises determining whether one or more of the identified transfer functions are incorrectly determined and substituting a reference transfer function for the identified transfer functions that are incorrectly determined in the processing of the seismic data.

10. The method of claim 1, wherein the seismic survey comprises an active seismic survey or a passive seismic survey.

11. A system comprising:
- an interface to receive seismic data acquired by seismic sensors in a seismic survey and second data indicative of associated sensor transfer functions provided by the seismic sensors; and
- a processor to:
  - determine an associated operator to apply to the seismic data acquired by each of the seismic sensors based at least in part on a frequency dependent variation between the associated sensor transfer function and a nominal response for the seismic sensor; and
  - process the seismic data, including performing deconvolution based on the determined operators.

12. The system of claim 11, wherein the processor is further adapted to:
process the seismic data, including applying the associated operators to the seismic data.

13. The system of claim 11, wherein the seismic sensors comprise geophones, geophone accelerometers and/or hydrophones.

14. The system of claim 11, wherein the second data is indicative of at least one of the following:
- the entire transfer function including frequency, magnitude and phase of the transfer function;
- parameters that describe the transfer function;
- parameters that describe the inverse of the transfer function; and
- the entire inverse transfer function, including frequency, magnitude and phase of the inverse transfer function.

15. The system of claim 11, wherein the processor is adapted to compensate the seismic data before deconvolution for production variations or temperature variations.

16. The system of claim 11, wherein the processor is adapted to identify whether one or more of the sensor transfer functions are outside of predetermined specifications and take corrective action in response thereto.

17. An article comprising a computer readable storage medium to store instructions that when executed by a computer cause the computer to:
- receive seismic data acquired by seismic sensors in a seismic survey and second data provided by the seismic sensors indicative of associated sensor transfer functions determined by the seismic sensors;
- determine an associated operator to apply to the seismic data acquired by each of the seismic sensors based at least in part on a frequency dependent variations between the associated sensor transfer function and a nominal response for the seismic sensor; and
- process the seismic data, including performing deconvolution based on the determined operators.

18. The article of claim 17, the storage medium storing instructions that when executed by the computer cause the computer to:
process the seismic data, including applying the associated operators to the seismic data.

19. The article of claim 17, wherein the seismic sensors comprise geophones, geophone accelerometers and/or hydrophones.

20. The article of claim 17, wherein the second data is indicative of at least one of the following:
- the entire transfer function including frequency, magnitude and phase of the transfer function;
- parameters that describe the transfer function;
- parameters that describe the inverse of the transfer function; and
- the entire inverse transfer function, including frequency, magnitude and phase of the inverse transfer function.

21. The article of claim 17, the storage medium storing instructions that when executed by the computer cause the computer to compensate the seismic data before deconvolution for production variations or temperature variations.

22. The article of claim 17, the storage medium storing instructions that when executed by the computer cause the computer to identify whether one or more of the sensor transfer functions are outside of predetermined specifications and take corrective action in response thereto.

* * * * *